(12) United States Patent
Gonikberg (10) Patent No.: US 8,624,780 B2
(45) Date of Patent: *Jan. 7, 2014

(54) METHOD AND SYSTEM FOR USING A WIRELESS LOCAL AREA NETWORK (WLAN) PHASE SHIFTER FOR SMART ANTENNA BEAM STEERING

(71) Applicant: Broadcom Corporation, Irvine, CA (US)

(72) Inventor: Mark Gonikberg, Los Altos Hills, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/689,405

(22) Filed: Nov. 29, 2012

(65) Prior Publication Data

US 2013/0088394 A1  Apr. 11, 2013

Related U.S. Application Data

(63) Continuation of application No. 13/185,268, filed on Jul. 18, 2011, now Pat. No. 8,330,653, which is a continuation of application No. 12/104,644, filed on Apr. 17, 2008, now Pat. No. 7,982,671.

(51) Int. Cl.
*G01S 5/02* (2010.01)

(52) U.S. Cl.
USPC .......................................................... 342/422

(58) Field of Classification Search
USPC .......................................................... 342/422
See application file for complete search history.

(56) References Cited

U.S. PATENT DOCUMENTS

| | | | | |
|---|---|---|---|---|
| 7,013,165 | B2 * | 3/2006 | Yoon et al. | 455/561 |
| 7,103,384 | B2 * | 9/2006 | Chun | 455/562.1 |
| 7,372,911 | B1 * | 5/2008 | Lindskog et al. | 375/267 |
| 2001/0038318 | A1 * | 11/2001 | Johnson et al. | 331/135 |
| 2003/0003924 | A1 * | 1/2003 | Lin | 455/456 |
| 2003/0012265 | A1 * | 1/2003 | Lin | 375/148 |
| 2005/0285803 | A1 * | 12/2005 | Iacono et al. | 343/702 |
| 2007/0230431 | A1 * | 10/2007 | Driesen et al. | 370/345 |
| 2007/0232359 | A1 * | 10/2007 | Pinheiro et al. | 455/562.1 |
| 2008/0002627 | A1 * | 1/2008 | Cha et al. | 370/334 |

* cited by examiner

*Primary Examiner* — Harry Liu
(74) *Attorney, Agent, or Firm* — Garlick & Markison (57) ABSTRACT

Phase shift values between signals received at a plurality of receiving antennas are determined to orient one or more receiving antennas of the plurality of receiving antennas during signal location. Subsequent signals are received utilizing the oriented receiving antennas. Candidate angle of arrival (AOA) values are computed based on the determined phase shift values during the signal location so as to adaptively orient the receiving antennas. Each of the candidate AOA values is iteratively selected one at a time to adaptively orient the receiving antennas. The receiving antennas may be adaptively oriented according to the computed receive signal power levels. The determined phase shift values may be rounded to nearest discrete phase shift values. In this regard, one candidate AOA value is selected for each of the receiving antennas based on the corresponding rounded phase shift values such that the receiving antennas may be adaptively oriented during the signal location.

20 Claims, 8 Drawing Sheets

METHOD AND SYSTEM FOR USING A WIRELESS LOCAL AREA NETWORK (WLAN) PHASE SHIFTER FOR SMART ANTENNA BEAM STEERING

CROSS-REFERENCE TO RELATED APPLICATIONS

The present U.S. Utility patent application claims priority under 35 U.S.C. §120, as a continuation of U.S. Utility patent application Ser. No. 13/185,268, filed Jul. 18, 2011, issuing as U.S. Pat. No. 8,330,653, which is incorporated herein by reference in its entirety for all purposes. The Ser. No. 13/185,268 application claims priority under 35 U.S.C. §120, as a continuation of U.S. Utility patent application Ser. No. 12/104,644, filed Apr. 17, 2008, now U.S. Pat. No. 7,982,671, which is also incorporated herein by reference in its entirety for all purposes.

FIELD OF THE INVENTION

Certain embodiments of the invention relate to data communication. More specifically, certain embodiments of the invention relate to a method and system for using a wireless local area network (WLAN) phase shifter for smart antenna beam steering.

BACKGROUND OF THE INVENTION

Wireless local area network (WLAN) systems enable the communication of data via a wireless communication medium by, for example, transmitting radio frequency (RF) signals that carry data between a transmitting station and a receiving station. A range of frequencies, referred to as the WLAN frequency spectrum, may be utilized for communication between stations in a WLAN system. The frequency spectrum may be divided into RF channels wherein each RF channel represented an assigned frequency within the WLAN frequency spectrum. Each RF channel may, in turn, comprise a range of frequencies referred to as an RF channel bandwidth. Each RF channel within the WLAN frequency spectrum may comprise a range of frequencies, which is non-overlapping and distinct from other RF channels.

Smart antenna systems may be utilized in WLAN systems to enable the transmission and/or reception of signals via a wireless communication medium. A smart antenna system may refer to a system, which may dynamically configure its directivity pattern. For a smart antenna system located at a transmitting station, most of the signal energy may be radiated in a particular direction. The desired transmission directivity pattern may be configured at a transmitting station based on the location of the receiving station. For example, the desired transmission directivity pattern may be selected to maximize the amount of signal energy transmitted by the transmitting station, which is received at the receiving station.

For a smart antenna system located at a receiving station, an antenna directivity pattern may be configured to coincide with the angle of arrival (AOA) of the received signals.

Antenna directionality is expressed in dBi (Decibel Isotropic) which is a measurement of focus that an antenna has compared to a mathematically ideal isotropic antenna which has a uniform focus in all directions.

Smart antenna systems may contain a plurality of highly directional antenna elements, wherein each antenna element may be oriented in a particular direction. In such highly directional antenna systems, the smart antenna system may enable selection of antenna elements to achieve a desired transmission directivity pattern. Such systems may be referred to as switched beam smart antenna systems. Smart antenna systems may also contain a plurality of omnidirectional antenna elements, wherein the antenna directivity pattern may be oriented, or steered, in various directions by adjusting the phase of the signal applied to each antenna element. Such systems may be referred to as adaptive array smart antenna systems.

Antenna directivity pattern in a smart antenna system may be selected based on received signal strength indication (RSSI) measurements taken from received signals and/or by analyzing the rate at which acknowledgments from previously transmitted protocol data units (PDU) are received. The acknowledgments may provide an indication to the transmitting station that previously transmitted PDUs were successfully received by the receiving station.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for using a wireless local area network (WLAN) phase shifter for smart antenna beam steering, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for using a wireless local area network (WLAN) phase shifter for smart antenna beam steering. Various embodiments of the invention comprise a system, which enables selection and/or adaptive steering of antenna directivity pattern in a smart antenna system. For a smart antenna system, which is located at a receiving station, the antenna directivity may be selected based on the angle of arrival (AOA) of a received signal. In a switched beam smart antenna system, antenna element(s) may be selected, which are most closely oriented toward the AOA. In an adaptive array smart antenna system, antenna directivity pattern may be steered, or reoriented, based on the AOA.

Figure 1:
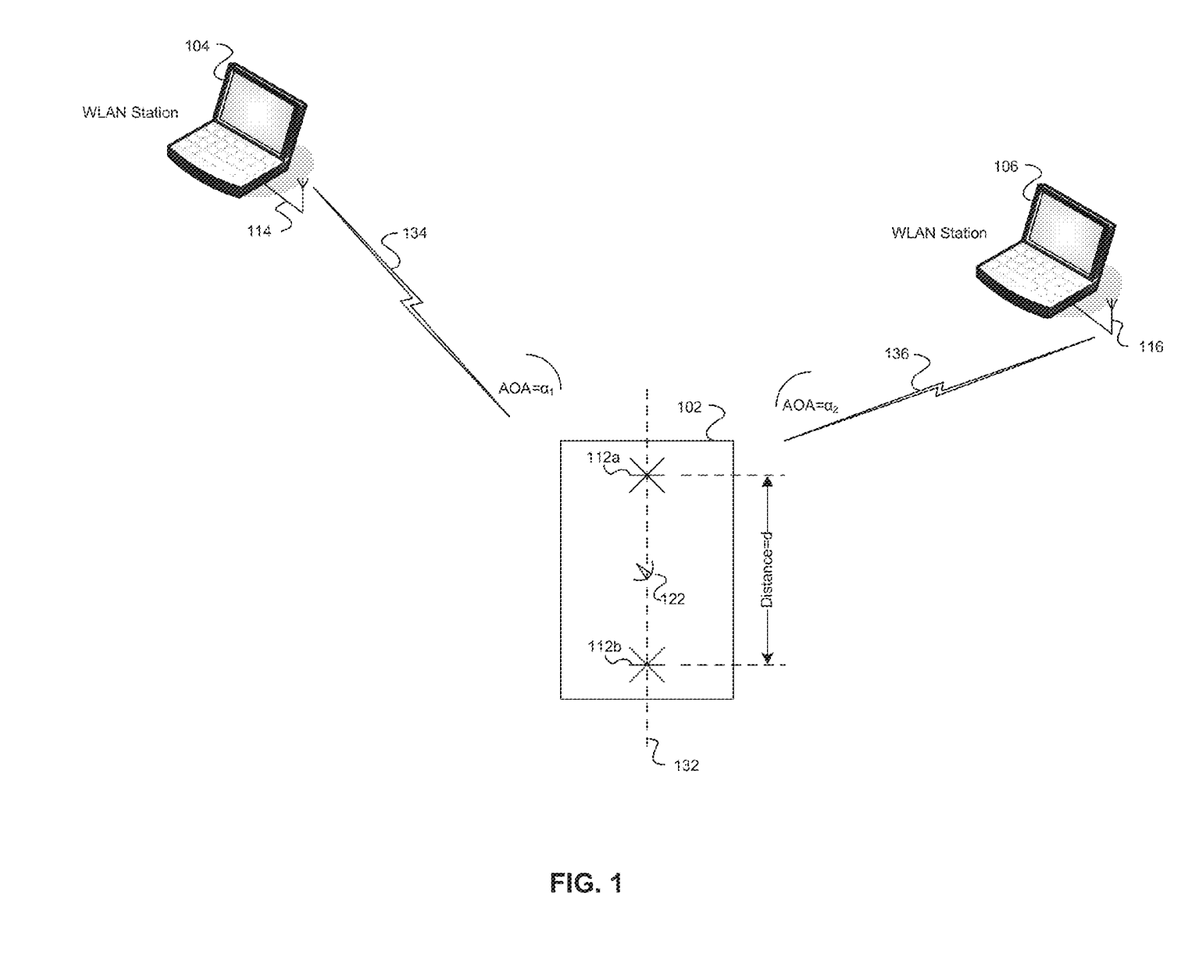
FIG. 1 is an exemplary wireless communication system, in accordance with an embodiment of the invention.

FIG. 1 is an exemplary wireless communication system, in accordance with an embodiment of the invention. Referring to FIG. 1, there is shown an access point (AP) 102, a wireless local area network (WLAN) station (STA) 104, and a STA 106. As shown in FIG. 1, the AP 102 comprises a plurality of omnidirectional antennas 112a and 112b and a smart antenna system 122. The antennas 112a and 112b may be separated by a distance, d. Each of the omnidirectional antennas 112a and 112b may be capable of receiving signals across a 360° range of AOA values with equal gain. In various embodiments of the invention, the smart antenna system 122 may be positioned at an intermediate location in relation to the antennas 112a and 112b. In various embodiments of the invention, the smart antenna system may comprise a switched beam smart antenna system and/or an adaptive array smart antenna system. The STA 104 comprises an antenna 114, and the STA 106 comprises an antenna 116. The AP 102 and the STA 104 may communicate wirelessly via a radio frequency (RF) channel 134. The AP 102 and STA 106 may communicate wirelessly via an RF channel 136. The antennas 112a and 112b and the smart antenna system 122 may enable the AP 102 to transmit and/or receive signals. The antenna 114 may enable the STA 104 to transmit and/or receive signals. The antenna 116 may enable the STA 106 to transmit and/or receive signals. The AP 102, STA 104 and STA 106 may enable communication based on one or more IEEE 802 standards, for example IEEE 802.11.

In operation, the STA 104 may transmit signals to the AP 102 via the RF channel 134 and the STA 106 may transmit signals to the AP 102 via the RF channel 136. The AOA value for signals received at the AP 102 via the RF channel 134 may be represented AOA=$\alpha_1$. The AOA value for signals received at the AP 102 via the RF channel 136 may be represented AOA=$\alpha_2$. The AOA values may be measured relative to a plane of incidence 132. The AP 102 may receive signals via the antenna 112a, 112b and/or the smart antenna system 122. In various embodiments of the invention, the AP 102 may enable reception of signals via RF channels 134 and/or 136 by adaptively steering the smart antenna system 122. For example, the AP 102 may adaptively steer antenna to an angle of $\alpha_1$ when receiving signals via the RF channel 134. The AP 102 may adaptively steer antenna to an angle of $\alpha_2$ when receiving signals via the RF channel 136.

Depending upon the relative positions of the AP 102 and the STA 104, the length of the signal path, $d_1$, from the transmitting antenna 114 to the receiving antenna 112a may differ from the length of the corresponding signal path, $d_2$, from the transmitting antenna 114 to the receiving antenna 112b. When $d_1 \ne d_2$ there may be a relative phase shift between the signal received at antenna 112a and the signal received at receiving antenna 112b.

During an exemplary signal location process, the AP 102 may select the antenna 112a to receive one or more signals. The AP 102 may then select the antenna 112b to receive subsequent one or more signals. The AP 102 may perform a signal correlation computation between signals received via the antenna 112a and corresponding signals received via the antenna 112b to determine the relative phase shift value. In various embodiments of the invention, the AP 102 may utilize a relative phase shift value to adaptively steer smart antenna 122.

FIG. 1 shows a smart antenna system 122, which can be a switched beam or adaptive array system. For example, an exemplary embodiment of the invention may comprise four (4) antenna elements in either a switched beam smart antenna or an adaptive array smart antenna system. In an exemplary switched beam smart antenna system, the antenna elements may be configured in a sector pattern. For example, in an exemplary sector pattern each of the antenna elements may be oriented within a distinct 90° range of potential AOA values (e.g. 0° to 89°, 90° to 179°, 180° to 269° and 270° to 359°). In an exemplary adaptive array smart antenna system, each of the antenna elements may be configured in a sector pattern, in which each antenna element may be individually steered to sweep across the range of AOA values within each respective sector (e.g. 0° to 89°, 90° to 179°, 180° to 269° and 270° to 359°, respectively).

Figure 2:
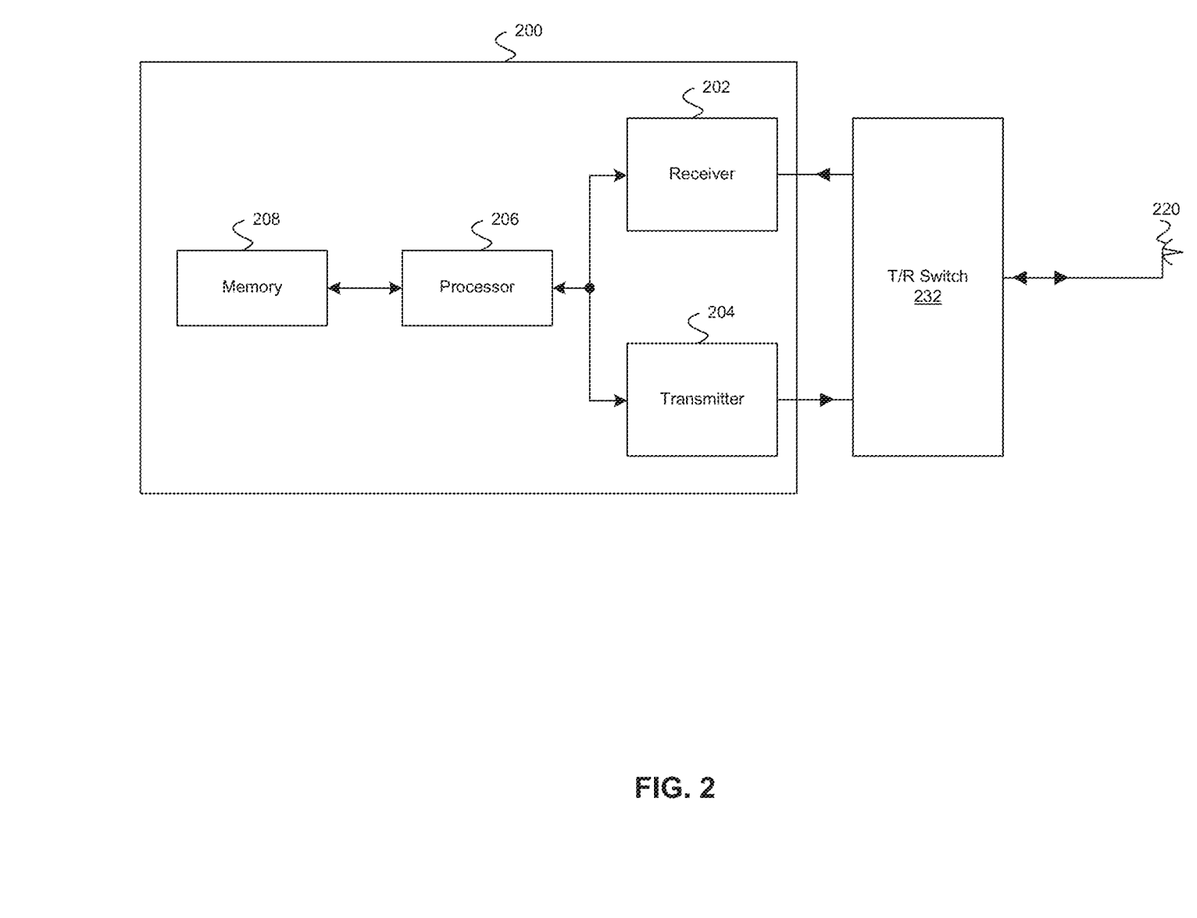
FIG. 2 is an exemplary transceiver comprising a smart antenna system, in accordance with an embodiment of the invention.

FIG. 2 is an exemplary transceiver comprising a smart antenna system, which may be utilized in connection with an embodiment of the invention. Referring to FIG. 2, there is shown a transceiver system 200 and a smart antenna system 220. The transceiver system 200 may comprise at least a receiver 202, a transmitter 204, a processor 206, and a memory 208. Although a transceiver is shown in FIG. 2, transmit and receive functions may be separately implemented.

The processor 206 may enable digital receiver and/or transmitter functions in accordance with applicable communications standards. The processor 206 may also perform various processing tasks on received data. The processing tasks may comprise computing channel estimates, which may characterize the wireless communication medium, delineating packet boundaries in received data, and computing packet error rate statistics indicative of the presence or absence of detected bit errors in received packets.

The receiver 202 may perform receiver functions that may comprise, but are not limited to, the amplification of received RF signals, generation of frequency carrier signals corresponding to selected RF channels, for example uplink channels, the down-conversion of the amplified RF signals by the generated frequency carrier signals, demodulation of data contained in data symbols based on application of a selected demodulation type, and detection of data contained in the demodulated signals. The RF signals may be received via antenna 220. The transmit and receive (T/R) switch 232 may be configured to enable antenna 220 to be utilized for reception of signals. The data received via the signals may be communicated to the processor 206.

The transmitter 204 may perform transmitter functions that may comprise, but are not limited to, modulation of received data to generated data symbols based on application of a selected modulation type, generation of frequency carrier signals corresponding to selected RF channels, for example downlink channels, the up-conversion of the data symbols by the generated frequency carrier signals, and the generation and amplification of RF signals. The data may be received from the processor 206. The RF signals may be transmitted via antenna 220. T/R switch 232 may be configured to enable antenna 220 to be utilized for transmission of signals.

The memory 208 may comprise suitable logic, circuitry and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM).

Figure 3:
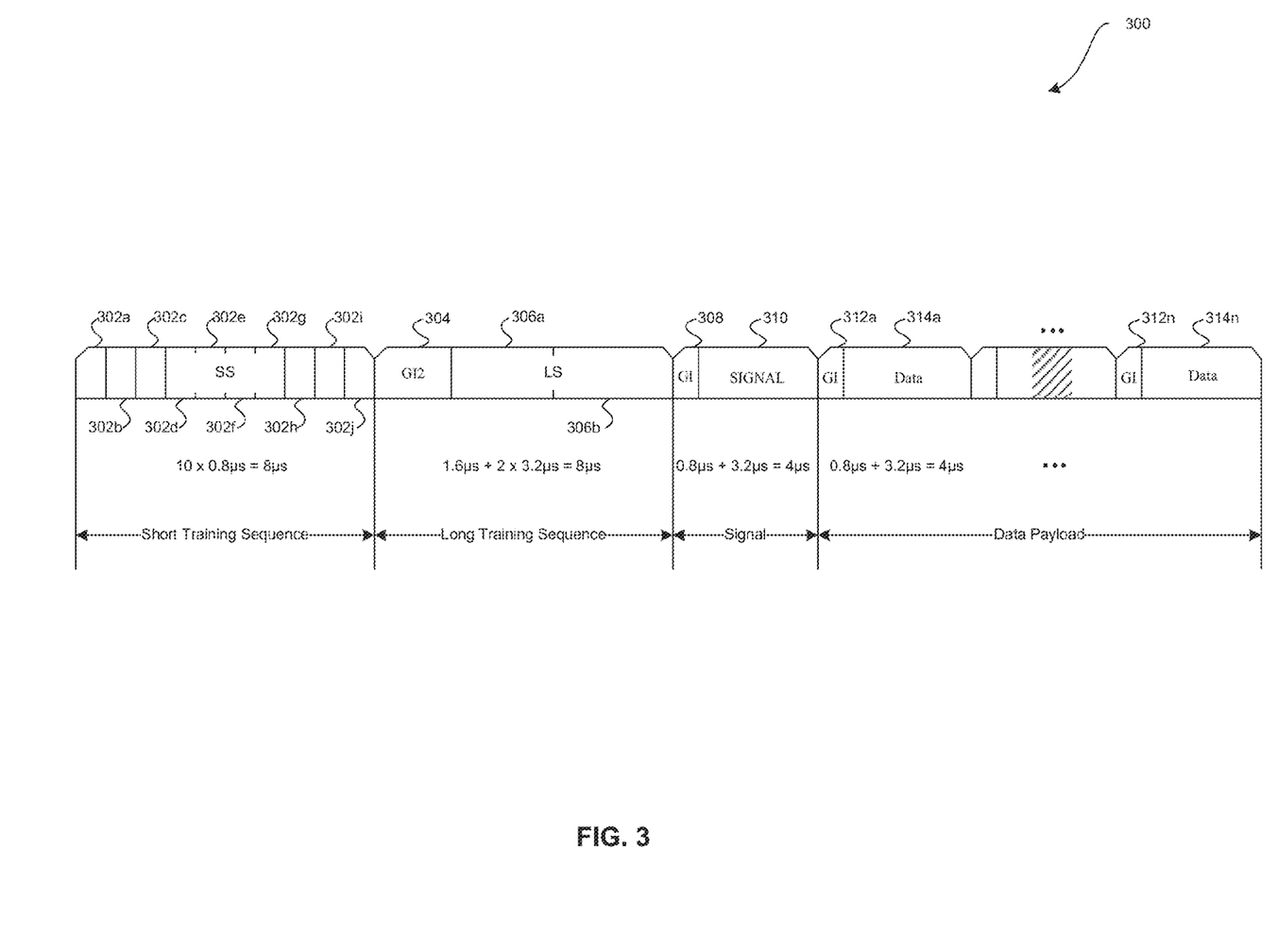
FIG. 3 is an illustration exemplary transmitted data unit in a WLAN, which may be utilized in connection with an embodiment of the invention.

In the context of the present application, the processor 206 and the memory 208 may enable the reception of signals via a wireless communication medium by adjusting directivity pattern of antenna 220. The processor 206 and the memory 208 may enable the selection of antennas 112a and/or 112b to receive signals. Based on the received signals, the processor 206 and the memory 208 may enable the computation of the relative phase shift of the signals received by antennas 112a and 112b. The processor 206 and the memory 208 may enable the selection of the candidate AOA value, whereby antenna 220 may be adaptively steered. The adaptively steered antenna 220 may be reoriented to point in the direction corresponding to the selected AOA value to enable the reception of subsequent signals. In a switched beam smart antenna system, the processor 206 and the memory 208 may select antenna elements based on the orientation of the antenna elements relative to the selected AOA value. In an adaptive array smart antenna system, the processor 206 and the memory 208 may reorient antenna 220 based on the determined AOA value FIG. 3 is an illustration exemplary transmitted data unit in a WLAN, which may be utilized in connection with an embodiment of the invention. Referring to FIG. 3, there is shown a physical layer protocol data unit (PPDU) 300. The PPDU 300 is exemplary of a PPDU, which may be transmitted, via a wireless communication medium, in a WLAN system. The PPDU 300 may comprise a short training sequence and a long training sequence. The short training sequence may comprise ten short training symbols 302a, 302b, 302c, 302d, 302e, 302f, 302g, 302h, 302i and 302j. The long training sequence may comprise two long training symbols 306a and 306b. Each of the short training symbols may represent a predetermined data symbol value, which is transmitted for a predetermined time duration, for example, 0.8 μs. Consequently, in the exemplary illustration of FIG. 3, the duration of the short training sequence is 8 μs Following the completion of the short training sequence, the long training sequence may begin. In the exemplary PPDU 300, the long training sequence begins with transmission of a long training sequence guard interval (GI2) 304. The GI2 304 represents a time duration, which begins at the end of transmission of the last short training symbol 302j and ends with the beginning of transmission of the first long training symbol 306a. In the exemplary PPDU 300, the GI2 304 time duration is 1.6 μs. Each of the long training symbols may represent a predetermined data symbol value, which is transmitted for a predetermined time duration, for example, 3.2 μs. Consequently, in the exemplary illustration of FIG. 3, the duration of the long training sequence, which comprises the GI2 304 and two long training symbols 306a and 306b, is 8 μs. The short training symbols 302a, 302b, 302c, 302d, 302e, 302f, 302g, 302h, 320i and 302j, and the long training symbols 306a and 306b may form the preamble field within the PPDU 300.

Following the completion of the long training sequence, the signal segment in the PPDU 300 may be transmitted. The signal segment may comprise a guard interval 308 and a signal symbol 310. The GI 308 represents a time duration, which begins at the end of transmission of the last long training symbol 306b and ends with the beginning of transmission of the signal symbol 310. In the exemplary PPDU 300, the GI 308 time duration is 0.8 μs. The signal symbol 310 may comprise data, which indicates the data transfer rate (as measured in megabits per second Mb/s, for example) supported by the PPDU 300 and the quantity of data being transferred in the data payload portion of the PPDU 300 (as measured in octets, for example). The signal symbol may be transmitted for a predetermined time duration, for example, 3.2 μs.

Following the completion of the signal segment, the data payload in the PPDU 300 may be transmitted. The data payload may comprise a plurality of data symbols 314a...314n, each separated by a GI 312a...312n. Each data symbol 314a...314n may comprise data, which is being transmitted from an AP 102 to a STA 104, for example. Each data symbol 314a...314n may be transmitted for a predetermined time duration, for example, 3.2 μs. The number of bits transmitted in each data symbol may be determined based on the contents of the signal symbol 310. For example, the data rate supported by the PPDU 300 may be computed based on the number of bits transmitted in each data symbol 314a, $b_{sym}$, divided by the data symbol duration 3.2 μs. The aggregate number of bits transmitted in the plurality of data symbols 314a...314n may also be determined based on the contents of the signal symbol 310.

In operation, a STA 104 may transmit a PPDU 300 by transmitting a plurality of signals at distinct time instants, t, via the antenna 114. Each signal may comprise a symbol from the PPDU 300. For example, the STA 104 may transmit a signal when transmitting the short training symbol 302a and may transmit a subsequent signal when transmitting the short training symbol 302b. The signals transmitted by the STA 104 at distinct time instants, t, may be represented as signals $s_1(t)$. The signals received by the AP 102 at distinct time instants, t, may be represented as signals $r_1(t)$. The STA 106 may transmit a PPDU 300 by transmitting a plurality of signals via the antenna 116. Each signal may comprise a symbol from the PPDU 300. The signals transmitted by the STA 106 may be represented as signals $s_2(t)$. The signals received by the AP 102 at distinct time instants, t, may be represented as signals $r_2(t)$.

Figure 4A:
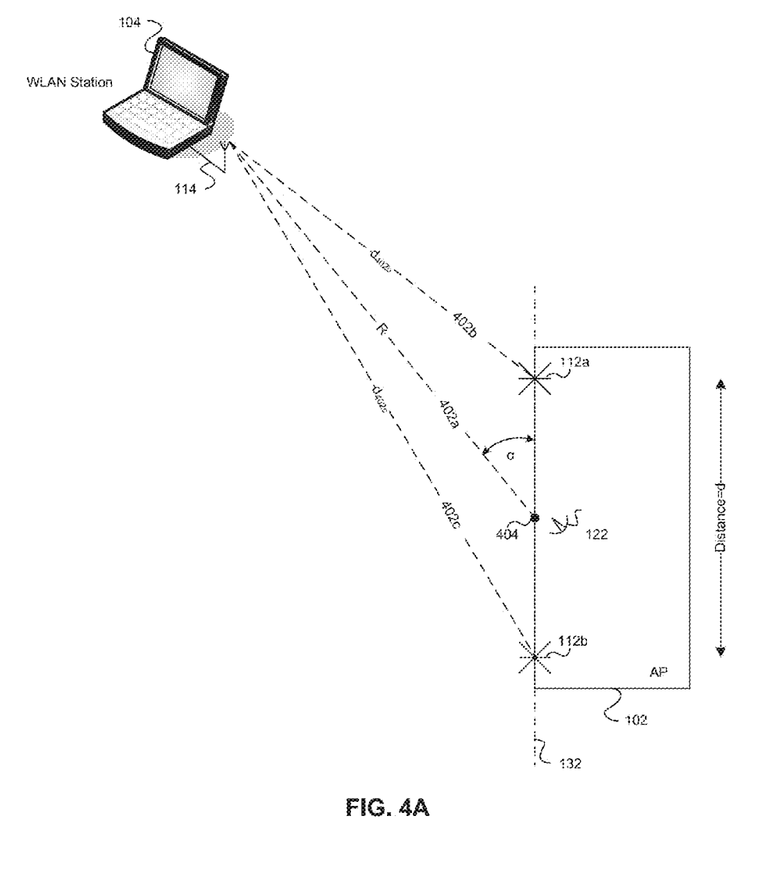
FIG. 4A is an exemplary diagram showing a WLAN phase shifter for smart beam steering, in accordance with an embodiment of the invention.

FIG. 4A is an exemplary diagram showing a WLAN phase shifter for smart beam steering, in accordance with an embodiment of the invention. Referring to FIG. 4A, the STA 104 may transmit signals s (t), which may be represented as shown in the following equation:

$$s(t) = Re\{A(t) \cdot e^{j \cdot \omega_t \cdot t}\} \qquad [1]$$

where $\omega_t$ refers to the carrier frequency generated by STA 104, t represents time, A(t) represents the baseband signal transmitted by the STA 104, and j represents $\sqrt{-1}$.

Given the signal s(t) as shown in equation [1], a line of sight (LOS) signal represented by the signal path 402b and received at the AP 102 via receiving antenna 112a, $r_{112a}(t)$, may be represented as shown in the following equation:

$$r_{112a}(t) \approx h_{112a} \cdot Re\left\{A(t) \cdot e^{j \cdot \left[\omega_t \cdot \left(t + \frac{d_{402b}}{C}\right)\right]}\right\} + \eta_{112a} \qquad [2]$$

where $h_{112a}$ refers to the attenuation of the signal along signal path 402b, $d_{402b}$ refers to the length of the signal path 402b, C refers to the velocity of propagation of RF signal via RF channel 134 and $\eta_{112a}$ refers to the thermal noise generated by antenna 112a.

The LOS signal received at the AP 102 via receiving antenna 112b, $r_{112b}(t)$, may be represented as shown in the following equation:

$$r_{112b}(t) \approx h_{112b} \cdot \text{Re}\left\{A(t) \cdot e^{j\left[\omega_t \cdot \left(t + \frac{d_{402c}}{C}\right)\right]}\right\} + \eta_{112b} \quad [3]$$

where $h_{112b}$ refers to the attenuation of the signal along signal path $402c$, $d_{402c}$ refers to the length of the signal path $402c$, C refers to the velocity of propagation of RF signal via RF channel 134 and $\eta_{112b}$ refers to the thermal noise generated by antenna 112b.

A relative phase shift, $\theta$, which refers to the phase of the LOS signal received at receiving antenna 112b relative to the phase of the LOS signal received at the receiving antenna 112a may be represented as shown in the following equation:

$$\theta = \frac{\omega_t}{C} \cdot (d_{402c} - d_{402b}) \quad [4]$$

Referring to FIG. 4A, the signal path 402b represents the signal path for the signal s(t), transmitted from antenna 114 to received signal $r_{112a}(t)$ at antenna 112a. The signal path 402b length is represented as $d_{402b}$. The signal path 402c represents the signal path for the signal s(t), transmitted from antenna 114 to received signal $r_{112b}(t)$ at antenna 112b. The signal path 402c length is represented as $d_{402c}$. A reference path 402a represents the distance from the antenna 114 to a midpoint 404, which is midway between the antennas 112a and 112b located along the plane of incidence 132. The midpoint 404 may correspond to the location of the smart antenna system 122. A midpoint distance, representing the distance from the midpoint 404 to the antenna 112a may be represented as ½d, where d represents the distance between the antenna 112a and the antenna 112b. The midpoint distance may also represent the distance from the midpoint 404 to the antenna 112b (½d). The length of the reference path 402a is represented as R. The AOA for signals received from the STA 104 at the AP 102 may be represented by the angle at which the reference path 402a intersects the plane of incidence 132. As shown in FIG. 4A, the AOA value may be represented as AOA=α. The AOA value AOA=α may represent the angle of arrival for signals received at the smart antenna system 122.

Based on the AOA value, AOA=α, the antenna distance, d, the midpoint distance, ½d, and the reference path 402a length, R, the signal path 402b length, $d_2$, and the signal path 402c length, $d_1$, may be represented as shown in the following equations:

$$d_{402b}^2 = R^2 + \frac{d^2}{4} - R \cdot d \cdot \cos(\alpha) \quad [5]$$

and:

$$d_{402c}^2 = R^2 + \frac{d^2}{4} + R \cdot d \cdot \cos(\alpha) \quad [6]$$

Based on equations [4], [5] and [6], the following equation may be derived:

$$\frac{\theta}{\omega_t} \cdot C \cdot (d_{402c} + d_{402b}) = 2 \cdot R \cdot d \cdot \cos(\alpha) \quad [7]$$

For values R>>d, equation [7] may be approximated as shown in the following equation:

$$\cos(\alpha) \cong \frac{C}{\omega_t \cdot d} \cdot \theta \quad [8]$$

Based on the relationship:

$$\cos(\alpha) = \cos(-\alpha) \quad [9]$$

Two candidates AOA values may be computed as follows:

$$\alpha_1 \in \left\{\arccos\left(\frac{C}{\omega_t \cdot d} \cdot \theta\right), -\arccos\left(\frac{C}{\omega_t \cdot d} \cdot \theta\right)\right\} \quad [10]$$

In operation, in an exemplary embodiment of the invention, a STA 104 may transmit a PPDU 300 via the transmitting antenna 114. The AP 102 may be initially configured to receive signals via the receiving antenna 112a. These signals may be represented as signals $r_{112a}(t)$ as shown in equation [2], for example. The AP 102 receiver 202 converts RF signal $r_{112a}(t)$ into baseband signal $b_{112a}(t)$:

$$b_{112a}(t) = g \cdot r_{112a}(t) \cdot e^{j[-\omega_r \cdot t + \varphi]} \quad [11]$$

$$\approx g \cdot h_{112a} \cdot A(t) \cdot e^{j\left[(\omega_t - \omega_r)\left(t + \frac{d_1}{C}\right)\right]} + g \cdot \psi \cdot \eta_{112a}$$

where $\omega_r$ refers to the local oscillator frequency generated by AP 102, $\varphi$ refers to the phase difference between the oscillator used to generate the transmitted signal at the STA 104 and the oscillator used to down convert received signal at the AP 102, g refers to the gain of the receiver and $\psi$ refers to the noise figure of the receiver.

The AP 102 may detect a received signal upon receipt of the short training symbol 302a. The AP 102 may receive short training symbols 302b and 302c via the receiving antenna 112a. The AP 102 may utilize the received short training symbols 302b and 302c to compute the frequency difference, $\omega_e$:

$$\omega_e = -\frac{1}{T} \cdot \arctan\left(\int_{t=t_1}^{t_1+T} b_{112a}(t) \cdot b_{112a}^*(t+T) \, dt\right) \approx \omega_t - \omega_r \quad [12]$$

where $t_1$ represents the time of the beginning of the short training symbol 302b, T refers to the symbol interval of the short training symbol 302b, T=0.8 us, (arg)* represents complex conjugate operation on the argument (for example, arg=$b_{112a}$ in equation [12]). The value $\omega_e$ may represent the clock frequency offset between the transmitter, STA 104, and the receiver, AP 102. In addition, the AP 102 may determine the power of the received baseband signal, $b_{112a}(t)$:

$$P_{112a} = \frac{1}{2T} \int_{t=t_1}^{t_1+2T} |b_{112a}(t)|^2 \, dt \quad [13]$$

After receiving short training symbols 302b and 302c, via receiving antenna 112a, the AP 102 may be configured to receive subsequent signals via the receiving antenna 112b. These signals may be represented as signals $r_{112b}(t)$ as shown in equation [3], for example. The AP 102 receiver 202 down converts RF signal $r_{112b}(t)$ into baseband signal $b_{112b}(t)$:

$$b_{112b}(t) = g \cdot r_{112b}(t) \cdot e^{j[-\omega_r \cdot t + \varphi]} \quad [14]$$

$$\approx g \cdot h_{112b} \cdot A(t) \cdot e^{j\left[(\omega_t - \omega_r)\left(t + \frac{d_2}{C}\right)\right]} + g \cdot \psi \cdot \eta_{112b}$$

The AP 102 may receive short training symbols 302e and 302f via the receiving antenna 112b. The AP 102 may also compute the relative phase of the signals $b_{112a}(t)$ and $b_{112b}(t)$ to determine a relative phase, θ by correlating baseband signal corresponding to short training symbols 302b and 302c received via antenna 112a and short training symbols 302e and 302f received via antenna 112b:

$$\theta \approx -\arctan\left(\int_{t=t_1}^{t_1+2T} b_1(t) \cdot b_2^*(t + 3T)\, dt\right) + 3T\omega_e \quad [15]$$

where $\omega_e$ refers to the frequency difference computed as shown in equation [12]. In addition, the AP 102 may determine the power of the received baseband signal $b_{112b}(t)$:

$$P_{112b} = \frac{1}{2T}\int_{t=t_1+3T}^{t_1+5T} |b_{112b}(t)|^2\, dt \quad [16]$$

In various embodiments of the invention, during the signal location process, a set of candidate AOA values can be determined based on relative phase shift value θ according to equation [10].

The AP 102 may maintain a discrete set of relative phase shift values $\theta_i, i\in[0;N]$ and corresponding sets of candidate AOA values $\{\alpha_i, -\alpha_i\}$. After calculating the value of θ the AP 102 may round it to the nearest $\theta_i$ and adaptively steer smart antenna 122 in the direction of one of the two AOA candidates $\{\alpha_i, -\alpha_i\}$ and proceed with the reception of the remainder of PPDU 300 using smart antenna 122. The AP 102 maintains a discrete set of antenna indication values $ant\_ind_i$ corresponding to the set of relative phase shift values $\theta_i, i\in[0;N]$. The selection between $\alpha_i$ and $-\alpha_i$ AOA candidates is based on antenna indication value $ant\_ind_i$. When $ant\_ind_i=0$ the smart antenna 122 is steered in the direction of $\alpha_i$. When $ant\_ind_i=1$ the smart antenna 122 is steered in the direction of $-\alpha_i$. If AP 102 receives PPDU 300 without errors the value remains unchanged otherwise antenna indication value is changed to the opposite.

Figure 4B:
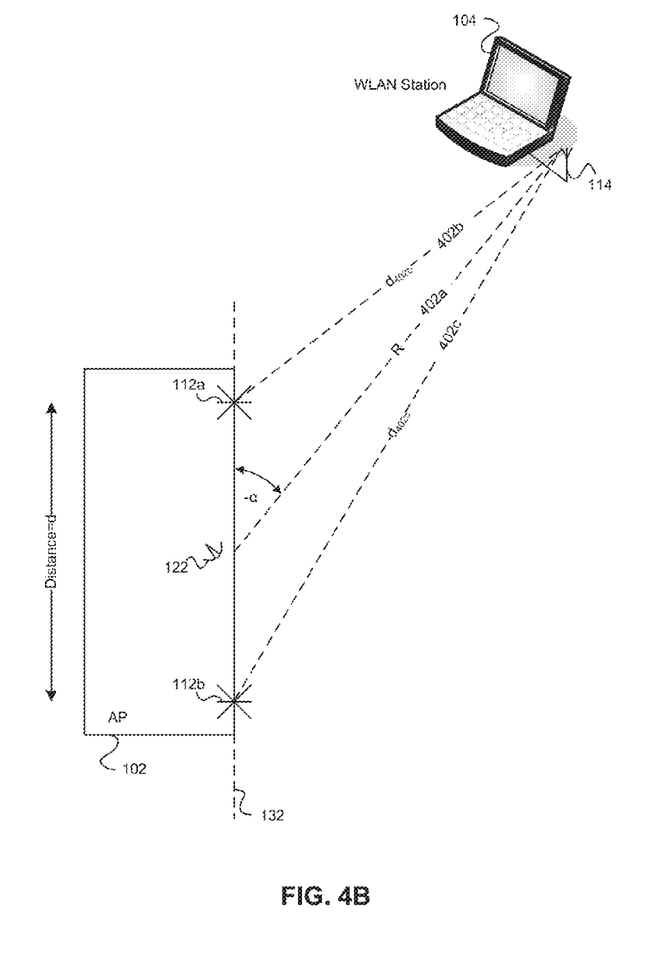
FIG. 4B is another exemplary diagram showing a WLAN phase shifter for smart beam steering, in accordance with an embodiment of the invention.

FIG. 4B is another exemplary diagram showing a WLAN phase shifter for smart antenna beam steering, in accordance with an embodiment of the invention. FIG. 4B presents a variation of the system shown in FIG. 4A, wherein the STA 104 is located such that the AOA value at the plane of incidence 132 is represented AOA=−α. In this instance, AP 102 may compute candidate AOA values AOA=α and AOA=−α, substantially as shown for the system in FIG. 4A. For the very first PPDU received by AP 102 from STA 104 the $ant\_ind_i$ may be set to 0 and the smart antenna 122 may be steered in the direction of AOA=$\alpha_i$ away from the STA 104. But once PPDU reception fails the value of $ant\_ind_i$ will be changed to 1 and the smart antenna 122 will be steered in the correct direction of AOA=$-\alpha_i$ for reception of subsequent PPDUs from STA 104.

Figure 5:
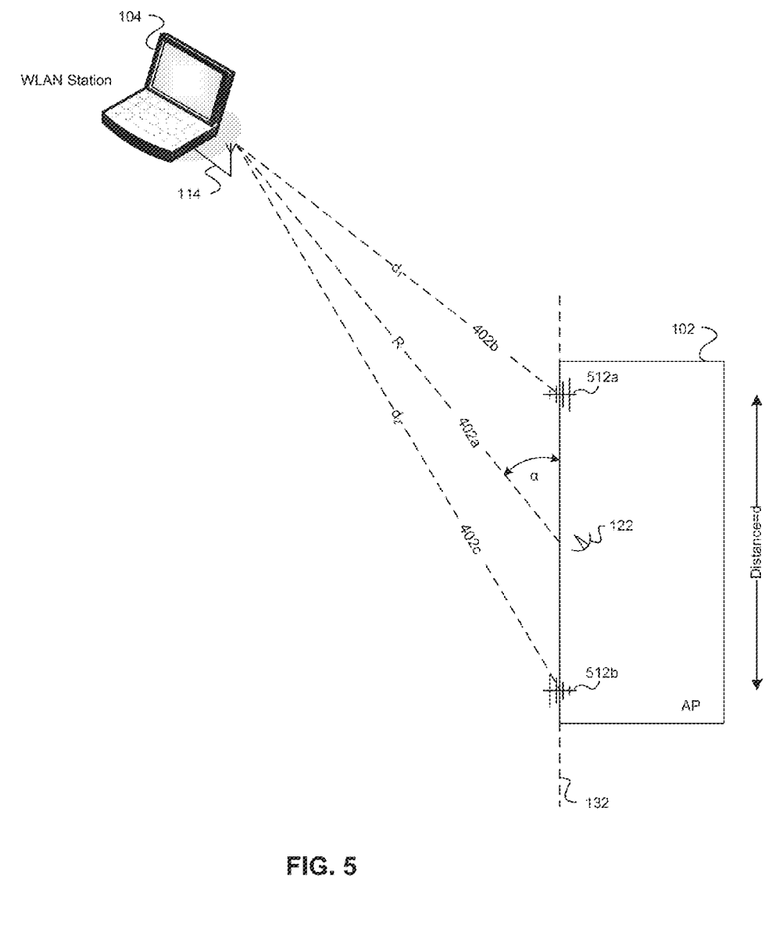
FIG. 5 is an exemplary diagram showing a WLAN phase shifter for smart beam steering utilizing directional antennas, in accordance with an embodiment of the invention.

FIG. 5 is an exemplary diagram showing a WLAN phase shifter for smart beam steering utilizing directional antennas, in accordance with an embodiment of the invention. FIG. 5 presents a variation of the system shown in FIG. 4A, wherein the omnidirectional antennas 122a and 122b may be replaced by directional antennas 512a and 512b, for example log-periodic antennas. The directional antenna may be capable of receiving signals across a range of AOA values (which is less than 360°) with substantially equal gain. Received signals for which the AOA value is outside of the AOA value range for the directional antenna may be received with lower gain than for received signals for which the AOA value is within the AOA value range. An exemplary directional antenna may, for example, have a 180° AOA value range. In various embodiments of the invention, the antenna 512b may be oriented at a 180° position relative to the antenna 512a. Consequently, the antenna 512a may receive signals across an AOA value range 0°≤AOA<180° relative to the plane of incidence 132, where the antenna 512b may receive signals across an AOA value range 180°≤AOA<360° relative to the plane of incidence 132.

In various embodiments of the invention, the signal location process may compute candidate AOA values AOA=α and AOA=−α, by utilizing antennas 512a and 512b in a manner substantially similar to the manner in which antennas 112a and 112b were utilized as shown for the system in FIG. 4A. The signal power comparison process may enable computation of signal power level for the signals received via antennas 512a and 512b. By comparing the signal power levels for the signals received via the antennas 512a and 512b, the AP 102 may determine an antenna indication value, $ant\_ind_i=0$, for example. Based on an indication from the signal power comparison process a candidate AOA value, AOA=α, may be selected. In response, an antenna may be adaptively steered to point in the direction AOA=α to enable reception of subsequent signals.

While the exemplary systems shown in FIGS. 1, 4A, 4B and 5 show an AP 102, which utilizes two (2) antennas during a signal location process, various embodiments of the invention may not be so limited. For example, in various embodiments of the invention, the AP 102 may utilize three (3) antennas to practice a signal location process, which determines AOA values in a three (3) dimensional space. Also in various embodiment of the invention the antenna elements of the smart antenna system may be used in place of the separate omnidirectional antennas.

Figure 6:
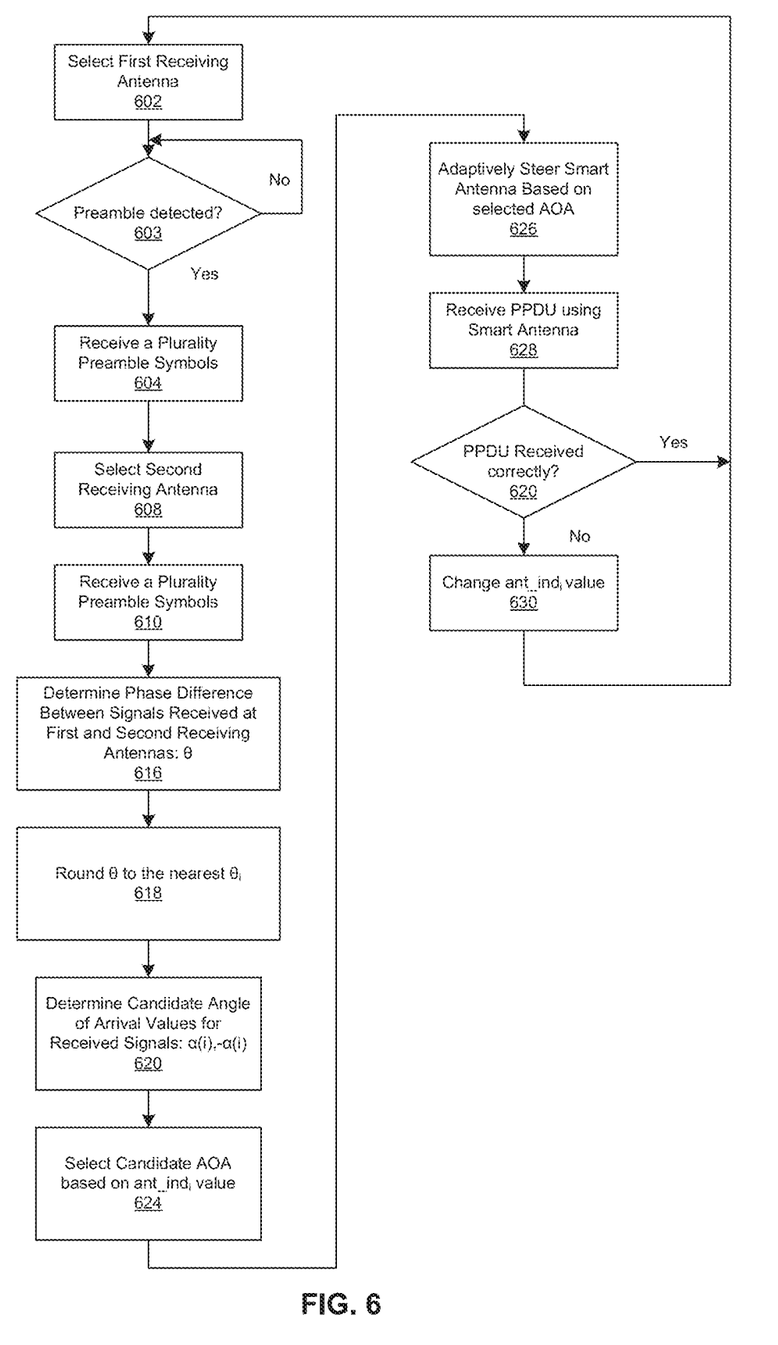
FIG. 6 is a flowchart illustrating exemplary steps for WLAN phase shifter for smart beam steering utilizing omnidirectional antennas, in accordance with an embodiment of the invention.

FIG. 6 is a flowchart illustrating exemplary steps for WLAN phase shifter for smart beam steering utilizing omnidirectional antennas, in accordance with an embodiment of the invention. Referring to FIG. 6, in step 602, the AP 102 selects a first antenna among a plurality of antennas, for example a reference antenna 112a may be selected from the plurality of antennas 112a and 112b. In step 603 the AP 102 waits for detection of the signal transmitted by the STA 104. In step 604, the first antenna may be utilized to receive a plurality of preamble symbols. The preamble symbols may be received at the AP 102 based on signals transmitted by the STA 104. Each transmitted signal may comprise a symbol from a PPDU 300. The received preamble symbols may comprise short training symbols.

In step 608, the AP 102 may select the second receiving antenna for example antenna 112b. In step 610, the second receiving antenna may be utilized to receive a plurality of preamble symbols. In step 616, a phase difference value, θ, may be determined between signals received at the first and second receiving antennas. In an exemplary embodiment of the invention, the phase difference value may be computed as shown in equation [15]. In step 618, the phase difference value θ may be rounded to the closest discrete value $\theta_i$. In step 620, the candidate angle of arrival values (AOA) may be computed for received signals from the STA 104. The AOA values may be determined with reference to a plane of incidence 132 and the location of a smart antenna system 122 located at the AP 102. The candidate AOA values may comprise AOA=$\alpha_i$ and AOA=$-\alpha_i$. In step 624 the candidate AOA is selected based on ant_ind$_i$.

In step 626, the AP 102 may steer smart antenna system 122 based on selected AOA. In step 628, the smart antenna 122 may be utilized to receive PPDU while oriented in the direction of selected AOA. In step 620, the AP 102 may check received PPDU for errors and in step 630 the AP 102 may change the value of ant_ind$_i$ if PPDU was not received correctly.

Figure 7:
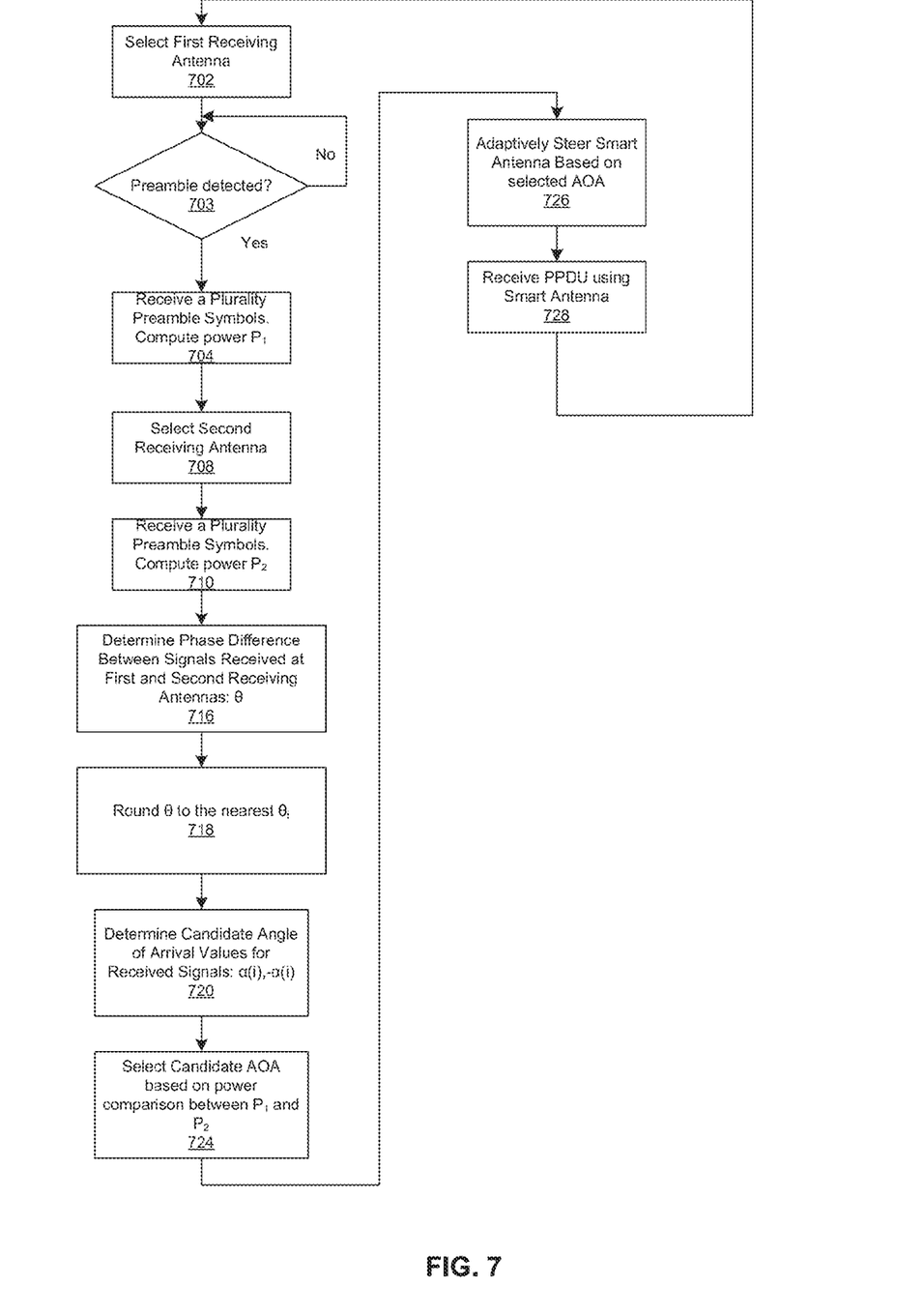
FIG. 7 is a flowchart illustrating exemplary steps for WLAN phase shifter for smart beam steering utilizing directional antennas, in accordance with an embodiment of the invention.

FIG. 7 is a flowchart illustrating exemplary steps for WLAN phase shifter for smart beam steering utilizing directional antennas, in accordance with an embodiment of the invention. Referring to FIG. 7, in step 702, the AP 102 may select a first antenna among a plurality of antennas, for example antenna 112a. In step 703 the AP 102 waits for detection of the signal transmitted by the STA 104. In step 704, the first antenna may be utilized to receive a plurality of preamble symbols and the AP 102 may compute the signal power levels $P_1$.

In step 708, the AP 102 may select a second receiving antenna, for example antenna 112b. In step 710, the second receiving antenna may be utilized to receive a plurality of preamble symbols and the AP 102 may compute the signal power levels $P_2$.

In step 716, a phase difference value, $\theta$, may be determined between signals received at the first and second receiving antennas. In an exemplary embodiment of the invention, the phase difference value may be computed as shown in equation [15]. In step 718, the phase difference value $\theta$ may be rounded to the nearest discrete value $\theta_i$. In step 720, the candidate angle of arrival values (AOA) may be computed for received signals from the STA 104. The AOA values may be determined with reference to a plane of incidence 132 and the location of a smart antenna system 122 located at the AP 102. The candidate AOA values may comprise AOA=$\alpha_i$ and AOA=$-\alpha_i$. In step 724 the candidate AOA is selected based on comparison of power values $P_1$ and $P_2$.

In step 726, the AP 102 may steer smart antenna system 122 based on selected AOA. In step 728, the smart antenna 122 may be utilized to receive PPDU while oriented in the direction of selected AOA.

Various aspects of a system for a WLAN phase shifter for smart antenna steering may comprise an AP 102 that enables a signal location process and an antenna selection process. The signal location process may comprise iterative selection of each receiving antenna in a plurality of receiving antennas 112a and 112b. Each of the receiving antennas may comprise an omnidirectional antenna. The receiving antennas may be selected iteratively, one at a time. The iteratively selected antennas may each enable reception of one or more signals. Each of the received signals may comprise a preamble symbol, for example a short training symbol 302b. At least one candidate AOA value may be computed based on the received one or more signals for each of the iteratively selected receiving antennas.

The antenna steering process may comprise steering of a smart antenna 122 based on the plurality of candidate AOA values computed during the signal location process. Subsequent signals may be received via the antenna 122 steered in the direction of the selected AOA. The subsequent signals may comprise one or more data symbols 314a . . . 314n.

Other aspects of a system for a WLAN phase shifter for smart antenna steering may comprise an AP 102 that enables a signal location process, a signal power comparison process and an antenna selection process. The signal location process may comprise iterative selection of each receiving antenna in a plurality of receiving antennas 112a and 112b. Each of the receiving antennas may comprise a directional antenna. The receiving antennas may be selected iteratively, one at a time. The iteratively selected antennas may each enable reception of one or more signals. Each of the received signals may comprise a preamble symbol, for example a short training symbol 302b. At least one candidate AOA value may be computed based on a reference signal and on the received one or more signals for each of the iteratively selected receiving antennas. The signal power comparison process may comprise computation of a signal power level for the received signal(s) for each of the iteratively selected receiving antennas. The antenna steering process may comprise selection of beam direction in a smart antenna system based on the plurality of signal power levels computed during the signal power comparison process. Subsequent signals may be received via smart antenna steered in the direction of the selected candidate AOA value.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Another embodiment of the invention may provide a machine-readable storage having stored thereon, a computer program having at least one code section executable by a machine, thereby causing the machine to perform steps as described herein for a WLAN phase shifter for smart antenna beam steering.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
    receiving a signal transmitted from a source at a first antenna;
    receiving the signal at a second antenna which is located at a different location than the first antenna and disposed at a preselected distance from the first antenna;

calculating a phase difference between the signal received at the first antenna and the signal received at the second antenna;

determining a candidate angle of arrival for the signal from the calculated phase difference by selecting the candidate angle from a set of stored angles of arrival with corresponding phase difference values based on the calculated phase difference;

using the candidate angle of arrival to determine a first angle (α) and a second angle (−α) as possible direction of the source of the signal;

steering a directional antenna towards a first direction as the source of the signal based on one of the first angle (α) or the second angle (−α);

receiving the signal at the directional antenna;

determining a parameter of the received signal at the directional antenna and when the parameter of the received signal at the directional antenna is of sufficient value for receiving the signal, using the first direction as the direction of the source, and when the parameter of the received signal at the directional antenna is not of sufficient value for receiving the signal, steering the directional antenna towards a second direction as the source of the signal based on other of the first angle (α) or the second angle (−α); and communicating further with the source with the directional antenna oriented to the source.

2. The method of claim 1, wherein training symbols of the signal are used to determine the phase difference.

3. The method of claim 1, wherein short training symbols of the signal are used to determine the phase difference to orient the directional antenna towards the source, in order to receive data following the short training source at the directional antenna.

4. The method of claim 1, wherein a first set of preamble symbols are received at the first antenna and a second set of preamble symbols are received at the second antenna to determine the phase difference.

5. The method of claim 1, wherein when determining the parameter of the received signal at the directional antenna, the parameter is a power level of the received signal.

6. The method of claim 1, wherein when determining the parameter of the received signal at the directional antenna, the parameter is an error level of the received signal.

7. The method of claim 1, wherein at least one of the first and second antennas is operable as the directional antenna.

8. A method comprising:

receiving a signal transmitted from a source at a first antenna of an antenna system;

receiving the signal at a second antenna of the antenna system, in which the second antenna is located at a different location than the first antenna and disposed at a preselected distance from the first antenna, and in which the first and second antennas are oriented in different directions;

calculating a phase difference between the signal received at the first antenna and the signal received at the second antenna;

determining a candidate angle of arrival for the signal from the calculated phase difference by selecting the candidate angle from a set of stored angles of arrival with corresponding phase difference values based on the calculated phase difference;

using the candidate angle of arrival to determine a first angle (α) and a second angle (−α) as possible direction of the source of the signal;

determining a first value of a parameter of the received signal at the first antenna and determining a second value of the parameter of the received signal at the second antenna and based on the parameter values determined, selecting one of the first angle (α) or the second angle (−α) corresponding to orientation of the first or second antenna;

using the antenna system as a directional antenna to steer the directional antenna towards the selected one of the first angle (α) or the second angle (−α) as a correct direction towards the source; and receiving the signal at the directional antenna to communicate further with the source with the directional antenna oriented to the source.

9. The method of claim 8, wherein training symbols of the signal are used to determine the phase difference.

10. The method of claim 8, wherein short training symbols of the signal are used to determine the phase difference to orient the directional antenna of the antenna system towards the source, in order to receive data following the short training source at the directional antenna.

11. The method of claim 8, wherein a first set of preamble symbols are received at the first antenna and a second set of preamble symbols are received at the second antenna to determine the phase difference.

12. The method of claim 8, further comprising computing a first signal power level for the signal received at the first antenna as the first value of a parameter and computing a second signal power level for the signal received at the second antenna as the second value of the parameter and comparing the first and second power levels to select the first angle α or the second angle −α as a correct angle of arrival for the signal.

13. The method of claim 8, wherein the parameter is a power level of the received signal.

14. The method of claim 8, wherein the antenna system is a switched beam antenna system.

15. The method of claim 8, wherein the antenna system is an adaptive array antenna system.

16. An apparatus comprising:

a receiver to receive a signal transmitted from a source at a first antenna and to receive the signal at a second antenna, in which the second antenna is located at a different location than the first antenna and disposed at a preselected distance from the first antenna;

a processor configured to operate with the receiver to process the signal received at the first and second antennas and to calculate a phase difference between the signal received at the first antenna and the signal received at the second antenna, the processor to determine a candidate angle of arrival for the signal from the calculated phase difference by selecting the candidate angle from a set of stored angles of arrival with corresponding phase difference values based on the calculated phase difference, and to use the candidate angle of arrival to determine a first angle (α) and a second angle (−α) as possible direction of the source of the signal, the processor to steer a directional antenna towards a first direction as the source of the signal based on one of the first angle (α) or the second angle (−α) to receive the signal at the directional antenna, the processor to determine a parameter of the received signal at the directional antenna and when the parameter of the received signal at the directional antenna is of sufficient value for receiving the signal, to use the first direction as the direction of the source, and when the parameter of the received signal at the directional antenna is not of sufficient value for receiving the signal, the processor to steer the directional antenna towards a second direction as the source of the signal based on other of the first angle ($\alpha$) or the second angle ($-\alpha$), for the receiver to further communicate with the source with the directional antenna oriented to the source.

17. The apparatus of claim 16, further including an antenna system, wherein the first, second and antennas are part of the antenna system.

18. The apparatus of claim 16, further including an antenna system, wherein the first and second antennas are part of the antenna system and the antenna system operates as the directional antenna.

19. The apparatus of claim 18, wherein the antenna system is a switched beam antenna system.

20. The apparatus of claim 18, wherein the antenna system is an adaptive array antenna system.

* * * * *